(12) United States Patent
Hartan et al.

(10) Patent No.: US 6,228,964 B1
(45) Date of Patent: *May 8, 2001

(54) WATER SOLUBLE, POWDERED, CATIONIC POLYELECTROLYTE COMPRISING A COPOLYMER OF ACRYLAMIDE AND DIMETHYLAMINOPROPYLACRYLAMIDE ESSENTIALLY FREE OF BIFUNCTIONAL COMPOUNDS

(75) Inventors: Hans-Georg Hartan, Kevelaer; Alfons Landscheidt, Krefeld, both of (DE)

(73) Assignee: Chemische Fabrik Stockhausen GmbH, Krefeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/863,999

(22) Filed: May 27, 1997

Related U.S. Application Data

(60) Continuation of application No. 08/573,795, filed on Dec. 18, 1995, now abandoned, which is a division of application No. 08/120,707, filed on Sep. 13, 1993, now Pat. No. 5,512,646, which is a continuation of application No. 07/942,475, filed on Sep. 9, 1992, now abandoned, which is a continuation of application No. 07/631,200, filed on Dec. 20, 1990, now abandoned, which is a continuation of application No. 06/942,329, filed on Dec. 16, 1986, now abandoned.

(30) Foreign Application Priority Data

Dec. 19, 1985 (DE) ................................. 35 44 909

(51) Int. Cl.[7] .................................................. C08F 220/60
(52) U.S. Cl. .......................................................... 526/307
(58) Field of Search ........................... 526/292.2, 291, 526/287, 307

(56) References Cited

U.S. PATENT DOCUMENTS 3,661,868 * 5/1972 Barron .
4,239,876 * 12/1980 Arndt ................................... 526/287
4,297,256 * 10/1981 McDonald .
4,319,013 * 3/1982 Cabestany ......................... 526/292.2
4,514,551 * 4/1985 Furuno .............................. 526/307.2

FOREIGN PATENT DOCUMENTS

| 134756 | * | 3/1985 | (EP) . |
| 0134756 | | 3/1985 | (EP) .............. C08L/33/26 |
| 193911 | * | 2/1984 | (JP) . |
| 210608 | * | 10/1985 | (JP) . |

OTHER PUBLICATIONS

Patent Abst. of Japan (cover page) vol. 9, No. 59 (Mar. 15, 1985).*
Chem Abst. 6001,102 (No. 16) 132938 w, Apr. 1985, (pg. 33)*
Cover page, Patent Abstracts of Japan, vol. 9, No. 59, Mar. 15, 1985; Chemical Abstracts 6001, 102(1985) Apr., No. 16, 132938w, p. 33.

* cited by examiner

Primary Examiner—Christopher Henderson
(74) Attorney, Agent, or Firm—Norris McLaughlin & Marcus

(57) ABSTRACT

A water-soluble, powdered, cationic polyelectrolyte comprising a copolymer of acrylamide and dimethylaminopropylacrylamide which is essentially free of bifunctional compounds and in which a) the dimethylaminopropylacrylamide is quaternized;

b) the quotient of the intrinsic viscosity of the copolymers divided by the molar ratio of acrylamide to dimethylaminopropylacrylamide is greater than 200; and c) the proportion of the cationic monomers in the polymer is between 4 and 80 mol-%, the copolymer having been obtained by copolymerization of acrylamide and quaternized dimethylaminopropylacrylamide said quaternized dimethylaminopropylacrylamide having been obtained by the reaction of dimethylaminopropylacrylamide with a quaternizing agent in the absence of acrylamide.

1 Claim, 1 Drawing Sheet

WATER SOLUBLE, POWDERED, CATIONIC POLYELECTROLYTE COMPRISING A COPOLYMER OF ACRYLAMIDE AND DIMETHYLAMINOPROPYLACRYLAMIDE ESSENTIALLY FREE OF BIFUNCTIONAL COMPOUNDS

CROSS REFERENCES TO RELATED APPLICATIONS

This application is a continuation of application Ser. No. 08/573,795, filed Dec. 18, 1995 (now abandoned), which is a division of application Ser. No. 08/120,707, filed Sep. 13, 1993, now U.S. Pat. No. 5,512,646, which is a continuation of application Ser. No. 07/942,475, filed Sep. 9, 1992 (now abandoned), which is a continuation of application Ser. No. 07/631,200, filed Dec. 20, 1990 (now abandoned), which is a continuation of U.S. application Ser. No. 06/942,329 filed Dec. 16, 1986 now abandoned.

BACKGROUND OF THE INVENTION

1. Field of the Invention

The present invention relates to copolymers of acrylamide and dimethylaminopropylacrylamide as flocculating agents, and a process for dewatering sludges which are generated during the mechanical or biological purification of municipal and industrial waste water by use of such agents.

2. Description of Related Art

The purification of waste water necessarily results in the generation of sludge. Depending on the purification process that is used, this sludge generally consists for the most part of water, with organic material dispersed therethrough.

A typical settled sludge from a municipal sewage treatment plant contains 95% water, of which approximately 70% is present in the form of cavity water, approximately 22% is present as capillary water, and approximately 8% is present as internal water. As a consequence of the high proportion of organic components, such a sludge is stabilized by negative charges on the surfaces of the particles and a reduction in the proportion of water is only possible by the use of powerful physical or chemical forces.

During the machine dewatering of turbid water, a flocculating agent is often used to accelerate the removal of the water. In the case of solid/liquid systems, such as are used in the purification of sludge, these flocculating agents are usually polymers of cationized acrylic acid derivatives or methacrylic acid esters or copolymers of these esters with acrylamide.

The use of these flocculating agents leads to a destabilization of the solid particles by neutralization of the surface charges and an agglomeration of the smaller particles, which results in formation of larger floccules. The cavity water that is liberated when this occurs as well as some of the capillary water can be removed by the use of conventional dewatering machines such as travelling screen presses, centrifuges, or chamber filter presses. However, depending on the type of sludge and the selection of the dewatering system, the sludge cakes that are formed still contain 60–85% water.

Polymers based on cationized acrylic acid or methacrylic acid esters, used for flocculating sewage sludge, display a number of disadvantages. For use as flocculating agents, such polymers must be the form of diluted 0.1 to 0.3% aqueous solutions. Because of the ester groups that are susceptible to hydrolysis, these solutions can only be stored for a limited time. In aqueous solvents with pH values from 7.0 to 7.5, acrylic derivatives are stable for only a few hours, and in the case of methacrylic derivatives, approximately 24 hours.

A further problem is encountered during the flocculation and dewatering of alkaline sewage sludge, which occurs during the stabilization of such sludge with lime or, for example, when the sludge is heated to approximately 80 to 90° C. Here, too, the effective use of the flocculating agents discussed above becomes impossible because of the hydrolysis of the esters.

Conventional dewatering systems such as centrifuges, travelling sieve presses and chamber filter presses each impose other demands on the conventional flocculating agents. Because of their heavy power requirements, which can amount to some 30,000 W/m³ of sludge, centrifuges require large shear resistant floccules which are as a rule formed by extremely high molecular weight flocculating agents. By contrast, the special demands encountered during dewatering using travelling band presses are satisfied by floccules that are stable under pressure and fulling conditions, preferably formed by polymers having a low degree of polymerization, and which are protected by the use of power inputs between 100 and 400 W/m³ of sludge. On the other hand, chamber filter presses require floccules that are stable under pressure and which drain well. This is achieved by the use of high molecular weight flocculating agents and relatively gentle conditioning.

The conventional flocculating agents that are based on (meth)-acrylic acid esters are not only susceptible to hydrolysis, but their effectiveness also depends on the conditions under which processing is carried out. That is to say that products with which it is possible to achieve an adequate flocculating effect by the use of gentle processing conditions with low power inputs fail under other conditions that require the inputs of larger amounts of power. For this reason, the conventional flocculating agents have to be specially adapted to the particular conditions under which the processing is carried out. Thus, a "universal" flocculating agent for the various dewatering systems would be desirable but, heretofore, it has been impossible to find such an agent amongst the conventional products.

U.S. Pat. No. 3,014,896 describes copolymers of dimethylaminopropylacrylamide (DMAPAA) and acrylamide (ACA) and their use as supplementary agents for dewatering sludge. However, with these agents, the maximum achievable viscosity for a 25% aqueous polymer solution only reaches 60 mPa.s. The DMAPAA of these copolymers is preferably neutralized with acetic acid, since mineral acids result only in low molecular weight polymers with a correspondingly low flocculating effectiveness.

SUMMARY OF THE INVENTION

It is an object of the present invention is to provide a product that is equally effective regardless of the conditions under which processing or dewatering is carried out and which is stable against hydrolysis to provide adequate stability during storage, and which is also suitable for flocculating alkaline sludges.

Thus, according to the present invention, there is provided a process for dewatering sludge which comprises the additional thereto of a copolymer of acrylamide and dimethylaminopropylacrylamide in the form of a diluted aqueous solution as flocculating agent, said copolymer being characterized by:

a) the dimethylaminopropylacrylamide having been neutralized with mineral acids or quaternized;

b) the quotient of the intrinsic viscosity of the copolymer divided by the molar ratio of acrylamide to dimethylaminopropylacrylamide is greater than 200; and c) the proportion of cationic monomers in the copolymer is between 4 and 80 mole-%.

According to further aspects of the invention, there are provided the novel polyelectrolyte useful in the above process and their process of preparation.

BRIEF DESCRIPTION OF THE DRAWINGS

The invention will be further described with reference to the accompanying drawing wherein.

DETAILED DESCRIPTION OF THE INVENTION

Figure 1:
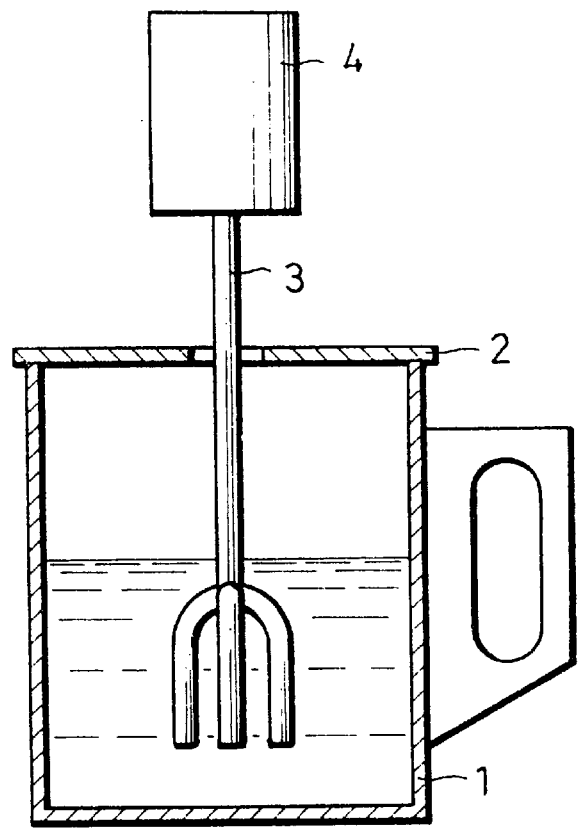
FIG. 1 is a schematic sectional view of a flocculation apparatus.

The copolymers of ACA and DMAPAA according to the present invention, in which the DMAPAA has either been neutralized by mineral acid or quaternized, which have a proportion of cationic monomers between 4 and 80 mole % and a quotient of viscosity divided by the molar proportion of cationic components of greater than 200, are stable during storage, are suitable for flocculating alkaline sludges, and display a high level of flocculating stability under all processing conditions and thus display good flocculating ability. Thus, they are suitable for processing conditions using power inputs ranging from 100 to 30,000 W/m$^3$. The copolymers of ACA or of DMAPAA neutralized with mineral acids or quarternized can be produced by known polymerization processes. According to the present invention, the purity of the DMAPAA is important for achieving the critical quotients of intrinsic viscosity divided by the molar ratio of ACA to DMAPAA of greater than 200. They should desirably be essentially free of bifunctional connections—i.e., the proportion of DMAPAA should only be very small. Bifunctional connections cause cross-linking in the polymer and thus lead to the formation of components that are insoluble in water and which reduce the effectiveness of the product. Thus, for example, N-alyllacrylamide can result from DMAPAA by the separation of dimethylamine. In order to achieve copolymers with the above quotients, the quantity of N-alyllacrylamide should not exceed 30 ppm.

In order to carry out the copolymerization of the dimethylaminopropylacrylamide with acrylamide, the salt of the basic monomers with acids or the conversion product with quatenizing agents such as methyl chloride or dimethylsulfate, is first formed. Next, an aqueous solution of the socationized monomers is produced with proportionate quantities of acrylamide and polymerized by radical polymerization. The polymerization can be initiated by a redox system such as the sodium bisulfite-potassium peroxide sulfate system, by thermally decomposable initiators such as azo-biisobutyronitrile, or by photochemically formed radicals of, for example, benzoinisopropyl ether.

Depending on the water content, the polymerization will result in a highly viscose solution, a rubber-like gel, or a brittle solid. After reduction of the water content to 5 to 15% and comminution, the products according to the present invention are obtained with grain sizes between 0.1 and 1 mm.

The present invention further relates to the use of the copolymers of ACA and DMAPAA as flocculating agents in a process for dewatering sludge resulting from mechanical or biological purification of municipal and industrial waste. For use as supplementary dewatering agents, 0.1 to 0.3% solutions are produced by mixing the powdered copolymers with water.

The production of the dimethylaminopropylacrylamide (DMAPAA) can be performed, for example, according to DE-OS 25 02 247 or EP 0 070 425 by the conversion of one mole of acrylic acid or acrylamide with 2 moles of dimethylaminopropylacrylamide, with subsequent pyrolysis.

Production of Copolymer DMAPAA.HCL/ acrylamide (20/80 mol %)

97 g of N,N-dimethylaminopropylacrylamide were dissolved in 660 g of water and acidified with 63 g of 37% hydrochloric acid. After the addition of 180 g of acrylamide the solution was heated to 55° C. and polymerization started with 100 mg of azo-biisobutyronitrile (AIBN). After standing for 3 hours, the gel-like copolymerization products was comminuted, dried, and ground down to form a white powder.

Viscosity (1% aqueous solution): 1500 mPa.s
Intrinsic viscosity: 980 ml/g
Quotient ($\eta$/molar proportion): 245

Production of Copolymer DMAPAA.CH3/ acrylamide (80/20 mole %)

330 g of DMAPAA.CH$_3$CL/ dimethylaminopropylacrylamide, quaternized with methyl chloride, and 29 g of acrylamide were added to 541 g of water with 200 mg azo-bisisobutyroamidine (AIBA) and after passage of nitrogen therethrough, the mixture was irradiated for 30 minutes by an Osram HWL 250-W lamp. The gel so obtained was dried to a residual water content of 9% and ground.

Viscosity (1% aqueous solution): 1200 mPa.s
Intrinsic viscosity: 57.5 ml/g
Quotient ($\eta$/molar proportion): 230

Referring now more particularly to the drawing, there is shown a test vessel 1 for receiving sludge. A removal cover 2 sits on the vessel, a stirrer 3 extending from a motor 4 through a hole in cover 2 into sludge within vessel 1.

The sludge sample is treated with a flocculant and stirred vigorously in vessel 1. The stirrer 3 and cover 2 are removed and the vessel 1 is emptied into a sieve 6 placed on a funnel. Liquid runs through the sieve into a measuring cylinder 5. By measuring the volume in cylinder 5 after a predetermined time, one can determine the effectiveness of the flocculant initially added to vessel 1.

Determination of the Dewatering Effect

Figure 2:
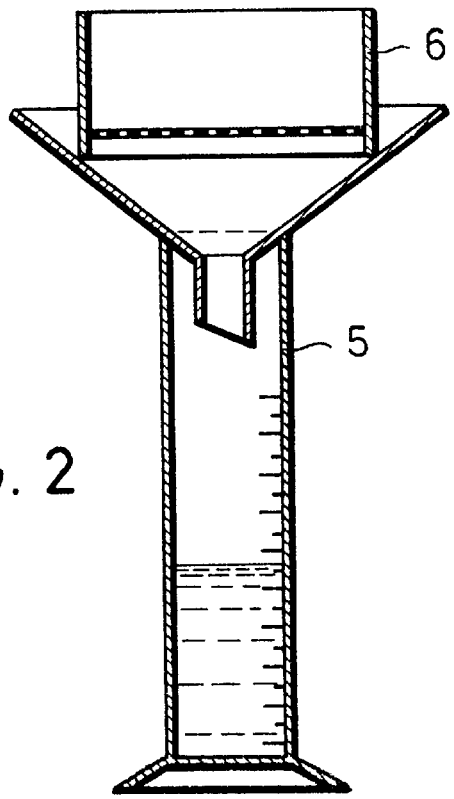
FIG. 2 is a schematic sectional view of a filter apparatus for measuring sludge dewatering.

A solution of the flocculating agent to be checked was added to a sample of municipal sewage sludge and subjected to specific shear conditions in the flocculation apparatus shown in FIG. 1. The flocculating sludge sample was then dewatered, as illustrated by FIG. 2, and the time taken to extract a specific quantity of filtrate was determined.

500 ml of the municipal sewage sludge was introduced into a test vessel 1 having a removable cover 2, and a measured quantity of flocculating agent solution was added thereto. The test vessel was placed in a stirring apparatus 3, in this case, a four-digit stirrer having a variable speed stirring motor 4. The motor was started, the current consumption was recorded and, after stirring, the stirrer was removed from the apparatus. The power required for conditioning the sludge was calculated by comparing the no-load current consumption of the motor with the current consumption recorded during stirring—the latter depending on the viscosity of the sludge and the stirring speed.

The sludge sample that had been conditioned with the flocculating agent was placed on a sieve 6 having a plastic mesh and the filtrate was collected in a measuring cylinder 5. The quantity of filtrate was determined as a function of the time, (see FIG. 2).

The following parameters were either determined or estimated:

1. Floccule Size
   1=very large floccules;
   5=very small floccules;
   less than 1=very large, very stable floccules.
2. Quantity of Filtrate
   Determination made after 10, 20, 30 and 60 seconds.
3. Concentrate Clearness (Visual Assessment)
   1=white;
   5=black.
4. Behaviour Under Pressure
   The filter cakes further dewatered by pressing by hand. The pressure stability of the sludge cakes so obtained was assessed.
   1=very good stability under pressure, the cake so obtained being of stable shape and releasing additional capillary water very easily with further pressure;
   5=very low stability under pressure; no further water removable from the cake by manual pressure.

The results of the flocculation tests using the flocculating agents according to the present invention (cationic components: DMAPAA) by contrast with conventional products (cationic components: DMAEA—dimethylaminoethylacrylate) are set out in the following table. For purposes of clarification, the examples according to the invention shown in the table are labelled as "invention" and the comparative examples that do not form part of the present invention are labelled as "comparison."

Examples 1 and 2 show that a dimethylaminopropylacrylamide polymer having a quotient ($\eta$/molar proportion) of 245, both after conditioning involving the use of high energy input and also after the use of low energy input, displays excellent dewatering results.

By contrast, comparative Examples 15–18 show that copolymers based on DMAEA, depending on the quotients ($\eta$/molar proportion), display filtration characteristics that may be considered good either under weak energy or under very strong energy processing conditions, but not both. A DMAEA polymer with a quotient of 160 displays unsatisfactory results at an energy input of 3900 W/m$^3$, whilst its use at an energy input of 400 W/m$^3$ is comparable to the DMAPAA copolymer. by contrast, if the DMAEA polymer has a quotient of 490 it responds only at a high energy input of 3900 W/m$^3$ and fails at lower energy input levels. The reason for this is the formation of large floccules having unfavourable water retention capabilities.

Comparative Examples 19 and 20 show that if the quotient ($\eta$/molar proportion) falls below the range according to the present invention, the effectiveness of the DMAPAA polymers is reduced.

Examples 3 and 4 show the universal behaviour of DMAPAA copolymers for weaker cationic copolymers with 4 mole % DMAPAA. The testing in this case involved a digested sludge that preferentially responded to weakly cationic polymers.

A mixed sludge of primary and excess sludge, which preferentially responded to higher cationic products, was used in Examples 5 and 6. Here too, the DMAPAA polymer with 40 mole % cationic component behaved equally well.

Examples 7 and 8 were carried out with a pure biological excess sludge. The DMAPAA polymer used had a proportion of 80 mole % cationic components. Under both weak and stronger processing conditions, comparably good results were obtained.

The storage characteristics of 0.1% polymer solutions of DMAPAA polymers by comparison with corresponding polymer solutions based on DMAEA are illustrated by Examples 9 to 12. After 24 hours, the DMAPAA polymers ("invention examples 9 and 10) were still as effective as the fresh solutions, whereas polymers based on DMAEA ("comparison" examples 11 and 12) showed no activity after 24 hours.

Examples 13 and 14 demonstrate the behaviour of DMAPAA polymer by comparison with DMAEA polymer in an alkaline adjusted sludge. The higher pH value resulted from a vapour return from the sludge drying apparatus installed after the dewatering stage.

| Example No. | | Invention 1 | Invention 2 | Invention 3 | Invention 4 |
|---|---|---|---|---|---|
| | Flocculating agent cationic components | DMAPAA.HCL | DMAPAA.HCL | DMAPAA.1/2 H$_2$SO$_4$ | DMAPAA T/2 H$_2$SO$_4$ |
| | Mole % | 20 | 20 | 4 | 4 |
| | Quotient ($\eta$/molar proportion) | 245 | 245 | 200 | 200 |
| | Solution - conc. % | 0,1 | 0,1 | 0,1 | 0,1 |
| | Added quantity (ppm) | 160 | 160 | 120 | 120 |
| | Sludge type | A | A | B | B |
| | Conditioning | | | | |
| | Stirring speed (rpm) | 750 | 240 | 750 | 240 |
| | Stirring duration (sec) | 10 | 60 | 10 | 60 |
| | power (W/m$^3$) | 3,900 | 400 | 3,900 | 400 |
| | Flocculed size | 2 | 2 | 2 | 1 |
| 1) | Filtrate quantity (ml) | | | | |
| | after 10 sec | 220 | 217 | 221 | 219 |
| | 20 sec | 270 | 268 | 268 | 270 |
| | 30 sec | 300 | 301 | 300 | 302 |
| | 60 sec | 335 | 337 | 337 | 336 |
| 2) | Concentrate clarity | 2 | 2 | 2 | 1 |
| 3) | Behaviour under pressure | 1 | 1 | 2 | 2 |

-continued

|  | Invention 5 | Invention 6 | Invention 7 | Invention 8 |
|---|---|---|---|---|
| Flocculating agent cationic components | DMAPAA.(CH₃)₂SO₂ | DMAPAA.(CH₃)₂SO₂ | DMAPAA.CH₃CL | DMAPAA.CH₃CL |
| Mole % | 40 | 40 | 80 | 80 |
| Quotient (η/molar proportion) | 270 | 270 | 230 | 230 |
| Solution - conc. * | 0,1 | 0,1 | 0,1 | 0,1 |
| Added quantity (ppm) | 140 | 140 | 150 | 150 |
| Sludge type | C | C | D | D |
| Conditioning Stirring speed (rpm) | 750 | 240 | 750 | 240 |
| Stirring duration (sec) | 10 | 60 | 10 | 10 |
| power (W/m³) | 3,900 | 400 | 3,900 | 400 |
| Floccule size | 2 | 1 | 3 | 2 |
| 1) Filtrate quantity (ml) |  |  |  |  |
| after 10 sec | 267 | 264 | 165 | 168 |
| 20 sec | 315 | 313 | 222 | 221 |
| 30 sec | 337 | 332 | 245 | 247 |
| 60 sec | 362 | 365 | 295 | 293 |
| 2) Concentrate clarity | 3 | 2 | 3 | 3 |
| 3) Behavior under pressure | 2 | 2 | 3 | 3 |

|  | Invention 9 | Invention 10 | Comparison 11 | Comparison 12 |
|---|---|---|---|---|
| Flocculating agent cationic components | DMAPAA.HCL | DMAPAA.HCL | DMAEA.HCL | DMAEA.HCL |
| Mole % | 20 | 20 | 20 | 20 |
| Quotient (η/molar proportion) | 249 | 245 | 270 | 490 |
| Solution - conc % | 0,1 | 0,1 | 0,1 | 0,1 |
| Added quantity (ppm) | 160 | 160 | 160 | 160 |
| Sludge type | A | A | A | A |
| Conditioning Stirring speed (rpm) | 750 | 240 | 240 | 750 |
| Stirring duration (sec) | 10 | 60 | 60 | 10 |
| power (W/m³) | 3,900 | 400 | 400 | 3,900 |
| Floccule size | 2 | 1 | 5 | 5 |
| 1) Filtrate quantity (ml) |  |  |  |  |
| after 10 sec | 230 | 228 | 50 | 45 |
| 20 sec | 281 | 278 | 65 | 61 |
| 30 sec | 312 | 300 | 78 | 76 |
| 60 sec | 339 | 337 | 110 | 109 |
| 2) Concentrate clarity | 2 | 1 | 5 | 5 |
| 3) Behaviour under pressure | 1 | 1 | 5 | 5 |

|  | Invention 13 | Comparison 14 | Comparison 15 | Comparison 16 |
|---|---|---|---|---|
| Flocculating agent cationic components | DMAPAA.CH₃CL | DMAEA.CH₃CL | DMAEA.HCL | DMAEA.HCL |
| Mole % | 30 | 30 | 20 | 20 |
| Quotient (η/molar proportion) | 260 | 470 | 270 |  |
| Solution - conc. % | 0,1 | 0,1 | 0,1 | 0,1 |
| Added quantity (ppm) | 120 | 120 | 160 | 160 |
| Sludge type | E | E | A | A |
| Conditioning Stirring speed (rpm) | 750 | 750 | 750 | 240 |
| Stirring duration (sec) | 10 | 10 | 10 | 60 |
| power (W/m³) | 3,900 | 3,900 | 3,900 | 400 |
| Floccule size | 2 | 4 | 4 | 2 |
| 1) Filtrate quantity (ml) |  |  |  |  |
| after 10 sec | 165 | 90 | 170 | 215 |
| 20 sec | 215 | 123 | 218 | 267 |
| 30 sec | 250 | 14B | 245 | 298 |
| 60 sec | 298 | 195 | 292 | 334 |
| 2) Concentrate clarity | 3 | 5 | 3 | 3 |
| 3) Behaviour under pressure | 2 | 4 | 4 | 2 |

|  | Comparison 17 | Comparison 18 | Comparison 19 | Comparison 20 |
|---|---|---|---|---|
| Flocculating agent cationic components | DMAEA.HCL | DMAEA.HCL | DMAPAA.HCL | DMAPAA.HCL |
| Mole % | 20 | 20 | 20 | 20 |
| Quotient (η/molar proportion) | 490 | 490 | 150 | 150 |
| Solution - conc. % | 0,1 | 0,1 | 0,1 | 0,1 |

-continued

|  | | | | |
|---|---|---|---|---|
| Added quantity (ppm) | 160 | 160 | 160 | 160 |
| Sludge type | A | A | A | A |
| Conditioning Stirring speed (rpm) | 750 | 240 | 750 | 240 |
| Stirring duration (sec) | 10 | 60 | 10 | 60 |
| power (W/m$^3$) | 3,900 | 400 | 3,900 | 400 |
| Floccule size | 2 | 1 | 4 | 3 |
| 1) Filtrate quantity (ml) | | | | |
| after 10 sec | 222 | 165 | 167 | 162 |
| 20 sec | 271 | 216 | 215 | 211 |
| 30 sec | 302 | 242 | 243 | 238 |
| 60 sec | 335 | 289 | 291 | 287 |
| 2) Concentrate clarity | 2 | 2 | 4 | 3 |
| 3) Behaviour under pressure | 2 | 5 | 3 | 3 |

A = Ilverich digested sludge
B = Neersen digested sludge
pH: 7.2 TS: 5.1% Ash: 62.5%
pH: 7.7 TS: 5.3% Ash: 56.7%
C = Krefeld mixed sludge (primary + excess)
D = Excess sludge
pH: 7.1 TS: 4.4% Ash: 30.5%
ph: 7.3 TS: 4.1% Ash: 23.7%
E = Stuttgart mixed sludge (digested sludge + excess sludge)
pH: 9.2 TS: 4.3% Ash: 45.7% Temperature: 70° C.

What is claimed is:

1. A water-soluble, powdered, cationic polyelectrolyte consisting essentially of copolymer of acrylamide and dimethylaminopropylacrylamide which is essentially free of bifunctional compounds and in which a) the dimethylaminopropylacrylamide is quaternized;

b) the quotient of the intrinsic viscosity of the copolymers divided by the molar ratio of acrylamide to dimethylaminopropylacrylamide is greater than 200; and c) the proportion of the cationic monomers in the polymer is between 4 and 80 mol-%, the copolymer having been obtained by copolymerization of acrylamide and quaternized dimethylaminopropylacrylamide said quaternized dimethylaminopropylacrylamide having been obtained by the reaction of dimethylaminopropylacrylamide with a quaternizing agent in the absence of acrylamide.

* * * * *